(12) United States Patent
Sun et al.

(10) Patent No.: US 6,532,093 B2
(45) Date of Patent: Mar. 11, 2003

(54) INTEGRATED MICRO-OPTO-ELECTRO-MECHANICAL LASER SCANNER

(75) Inventors: Decai Sun, Los Altos, CA (US); Michel A. Rosa, San Jose, CA (US); Chingwen Yeh, Cupertino, CA (US)

(73) Assignee: Xerox Corporation, Stamford, CT (US)

( * ) Notice: Subject to any disclaimer, the term of this patent is extended or adjusted under 35 U.S.C. 154(b) by 3 days.

(21) Appl. No.: 09/731,339

(22) Filed: Dec. 6, 2000

(65) Prior Publication Data

US 2002/0067533 A1 Jun. 6, 2002

(51) Int. Cl.[7] ............................................. G02B 26/08
(52) U.S. Cl. ....................... 359/198; 359/223; 359/224; 359/201
(58) Field of Search .................. 359/196–199, 359/212, 223, 224, 838, 848, 871, 872, 298; 257/98, 103

(56) References Cited

U.S. PATENT DOCUMENTS

| 5,629,790 A | * | 5/1997 | Neukermans et al. ....... 359/198 |
| 5,742,419 A | | 4/1998 | Dickensheets et al. |
| 5,867,297 A | | 2/1999 | Kiang et al. |
| 6,002,507 A | | 12/1999 | Floyd et al. |
| 6,014,240 A | * | 1/2000 | Floyd et al. ................ 359/201 |
| 6,094,289 A | | 7/2000 | Moranski et al. |
| 6,102,294 A | | 8/2000 | Swartz et al. |
| 6,356,689 B1 | * | 3/2002 | Greywall ..................... 385/52 |

OTHER PUBLICATIONS

Deborah S. Patterson, Flip Chip Technologies, 3701 E. University Drive, Phoenix, AZ, Seminar, *A Comparison of Popular Flip–Chip Bumping Technologies* (Test, Assembly & Packaging Conference (InterPACK '97), in Kona, HW, 1997). (No month).

M. Edward Motamedi, et al, *Development of Micro–Electro–Mechanical Optical Scanner*, Soc. of Photo–Optical Instrumentation Engineers, Bellingham, US, vol. 36, No. 5, May 1, 1997, pp. 1346–1352, XP000692364, ISSN: 0091–3286.

* cited by examiner

*Primary Examiner*—James Phan
(74) *Attorney, Agent, or Firm*—Fay, Sharpe, Fagan, Minnich & McKee, LLP

(57) ABSTRACT

A micro-optical-electrical-mechanical laser scanner is configured from a silicon-on-insulator substrate having a silicon substrate layer, a buried oxide layer, and a single crystal silicon device layer. A first device layer portion having a micro-mirror fabricated therefrom. A laser is connected to a second device layer portion, and a hinge connects the first device layer portion and the second device layer portion. The hinge is formed with a bimorph material, wherein the bimorph material creates built-in stresses in the hinge. The bimorph hinge moves the released micro-mirror out of the horizontal plane to a position for either directly or indirectly reflecting laser light emitted from the laser.

21 Claims, 9 Drawing Sheets h: HINGE THICKNESS
y: ELASTIC MODULE
δ: IN-SITU STRESS
L: HINGE LENGTH
b: CURLING HEIGHT OF THE HINGE

INTEGRATED MICRO-OPTO-ELECTRO-MECHANICAL LASER SCANNER

The U.S. Government has a paid up license in this invention and the right, in limited circumstances, to require the patent owner to license others on reasonable terms as provided for by the terms of contract number 70NANB8H4014, awarded by NIST.

BACKGROUND OF THE INVENTION

Use of laser-based scanners have important applications such as bar-code scanning, retina-scanning, and xerographic printing. Integrated micro-opto-electro-mechanical (MOEMS) laser scanners are useful for these applications as well as others, due to their compact size and low cost. For example, in use with xerographic printing, integrated MOEMS-based laser scanners are an attractive option in constructing agile raster-optical scanning (ROS) systems for use in laser printing in order to achieve a scan resolution higher than conventional laser polygon ROS systems. With integrated MOEMS scanners it is possible not only to adjust the laser beam position in the low scan direction to correct errors such as a bow in a scan line caused by the polygon wobbling, but also to place the laser spot precisely at a sub-pixel resolution. Manufacturing integrated MOEMS based laser systems however involve complex micro-manufacturing techniques.

It would, therefore be beneficial to configure an integrated MOEMS-based scanner system which is less complex to manufacture and robust in mechanical operation, while at the same time, providing a compact-size, low-cost and improved resolution.

SUMMARY OF THE INVENTION

A micro-optical-electrical-mechanical laser scanner is configured from a silicon-on-insulator substrate having a silicon substrate layer, a buried oxide layer, and a single crystal silicon device layer. A first device layer portion has a micro-mirror fabricated therefrom. A laser is connected to a second device layer portion, and a hinge connects the first device layer portion and the second device layer portion. The hinge is formed with a bimorph material, wherein the bimorph material creates built-in stresses in the hinge. The bimorph hinge moves the released micro-mirror out of the horizontal plane to a position for either directly or indirectly reflecting laser light emitted from the laser.

DETAILED DESCRIPTION OF PREFERRED EMBODIMENTS

Figure 1:
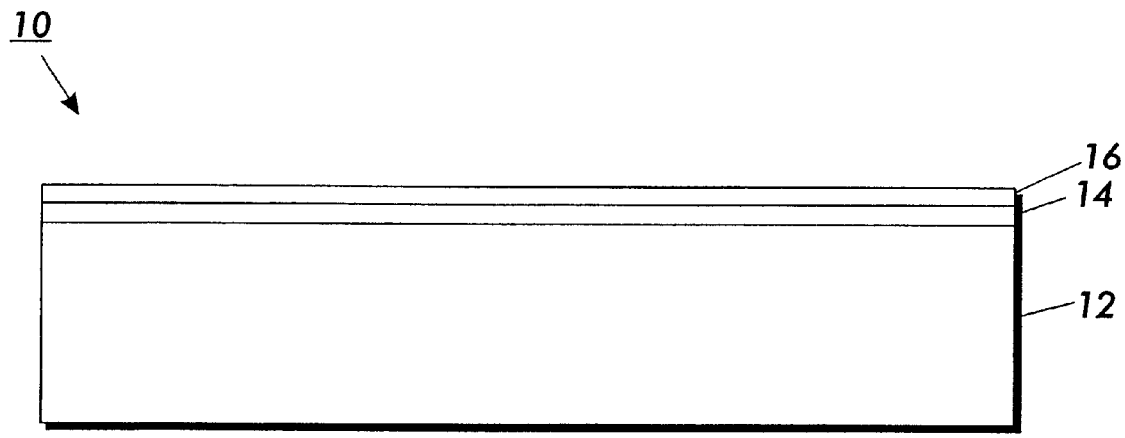
FIG. 1 is a side view of a silicon-on-insulator wafer used in the present invention.

Turning to FIG. 1, illustrated is a silicon-on-insulator (SOI) substrate wafer 10 which is processed in accordance with a first embodiment of the present invention. Wafer 10 includes a silicon substrate 12, a buried oxide layer 14, and a single crystal silicon device layer 16. The following discussion describes processing steps used to manufacture an integrated MOEMS layer scanner assembly according to the present application. It is to be appreciated, however, that a number of different lithographic processes may be used in the present invention.

Figure 2:
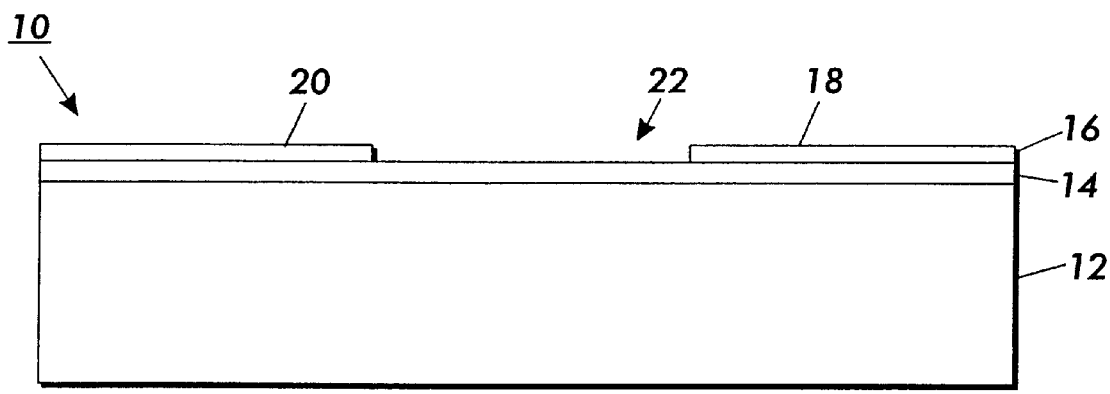
FIG. 2 depicts the SOI substrate or wafer of FIG. 1 etched to have a first portion and a second portion of the single crystal silicon device layer.

As shown in FIG. 2, an initial step patterns and etches device layer 16 such that a first device layer portion 18 and a second device layer portion 20 are formed by the removal of device layer material thereby forming trench 22. The material of device layer 16 at trench 22 is removed until reaching buried oxide layer 14. In another embodiment trench 22 may be extended down to silicon substrate 12.

Figure 3:
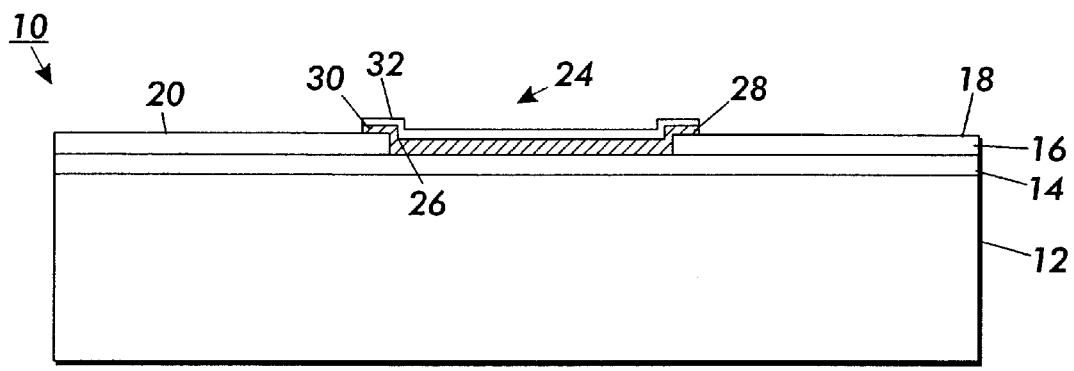
FIG. 3 illustrates the hinge formed with a bi-morph material according to the present invention.

In FIG. 3, a hinge component 24 is created by having a hinge body 26 formed within trench 24, with finger portions 28 and 30 located on respective first device layer portion 18 and second device layer portion 20. Depositing hinge component 24 in this manner, connects or integrates the first device layer portion 18 and second device layer portion 20 via hinge body 26. As also shown in FIG. 3, a bimorph material 32 is deposited on top of hinge body 26. The bimorph material 32 may consist of a single layer or multiple layers utilizing a combination of compressive and tensile stresses resulting in a stress gradient across hinge 24. The bimorph material can in one embodiment be deposited through the use of a lift-off technique.

The single bimorph layer may be a metal layer such as sputtered Mo—Cr with compressive and tensile stress gradient, and the multiple layers may be composed of compressively stressed poly-Si on the bottom and tensile-strained metal on the top. For example, hinge body 26 may be constructed of the compressively stressed poly-Si. Hinge 24 is of sufficient mechanical strength to maintain the connection between the first device layer portion 18 and second device layer portion 20 when movement of at least one of the device layer portions 18,20 cause torque forces to be exerted on the hinge. It is also to be appreciated that hinge 24 may be made entirely of bimorph material 32, including hinge body 26.

While bimorph material 32 generates compressive and tensile stresses which act to pull up on the first device layer portion 18 and second device layer portion 20, since these device layer portions are attached to the buried oxide layer 14, the portions are maintained in a planer position.

Figure 4:
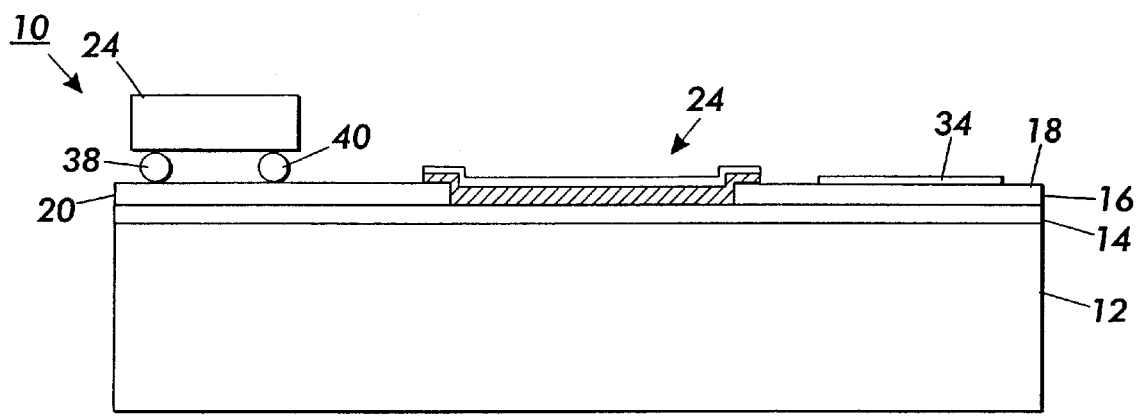
FIG. 4 shows a micro-mirror and edge-emitting laser attached to the first and second portions of the device layer.

Turning to FIG. 4, additional manufacturing steps deposit a micro-mirror 34 on the first device layer portion 18 by known lithographic techniques. Next, a laser chip or assembly 36, such as an edge emitting laser, is connected to an upper surface of the second device layer portion 20, by flip-chip technology using solder balls 38 and 40. It is to be appreciated, however, that other connection techniques are also possible. The connection technique used should permit micro-positioning of the laser chip.

Figure 5:
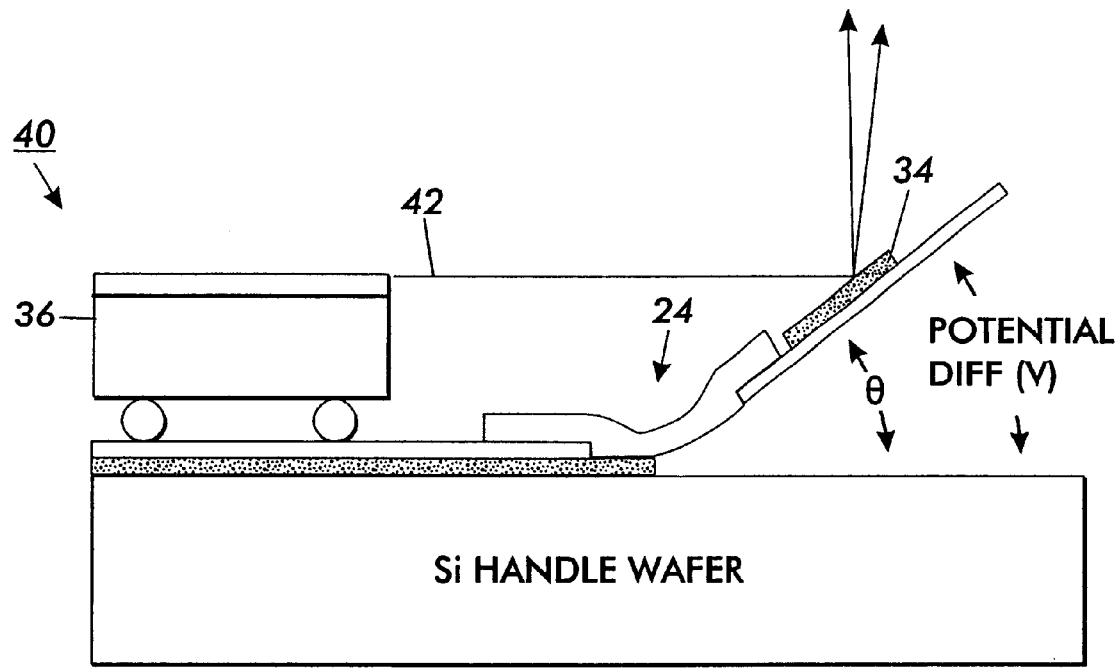
FIG. 5 depicts an integrated MOEMS laser scanner according to the teachings of the present invention.

Turning to FIG. 5, depicted is integrated MOEMS laser scanner 40, where micro-mirror 34, carried on first device layer portion 18, and a portion of the hinge component 24 have been released from the buried oxide layer 14. Particularly, in this embodiment the buried oxide layer 14 under the first device layer 18 and a portion of hinge 24 have been removed through known etching processes such that the tension forces in hinge 24 cause movement of first device layer portion 18 to be moved out of the device layer plane. The tensile stresses, result in a stress gradient which causes mirror 34 to be raised to an angle of 45° relative to the surface of device layer 16.

By this configuration, when laser beam 42 is emitted from edge-emitting laser chip 36, the laser beam is reflected normal to the substrate surface. The surface normal emission allows for easy packaging of the system in a TO can package. This assembly, incorporating the bimorph effect, is useful in making MOEMS-based optical switches, and micro-mechanical spring contacts. The flip-chip attachment positioning process allows for precise placement of laser 36 on device layer 16 relative to mirror 34.

It is to be appreciated that while micro-mirror 34 is shown as a separate device from the upper surface of first device layer portion 18, micro-mirror 34 may in fact be the polished upper surface of the first device layer portion 18.

Figure 6:
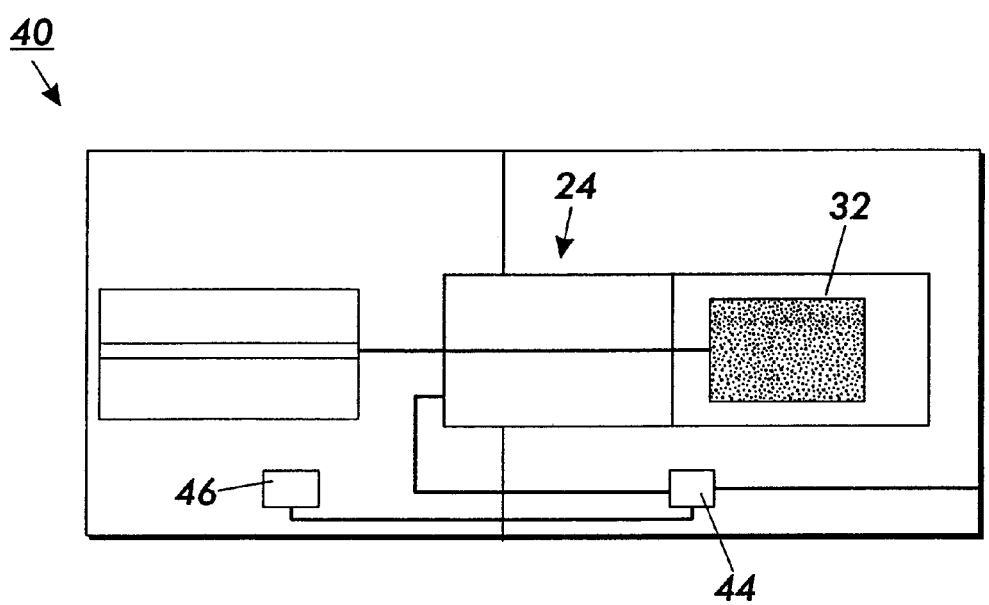
FIG. 6 is a top view of the laser scanner of FIG. 5.

Turning to FIG. 6, illustrated is a top view of the integrated MOEMS laser scanner 40 of FIG. 5. It is noted by viewing FIGS. 5 and 6 that micro-mirror 34 may be designed as a passive structure such that when it is released from buried oxide layer 14, the predetermined tension within hinge 24 determines the angle at which the mirror is positioned and maintained. Alternatively, when the bimorph material is of a metallic substance, micro-mirror 34 can be scanned electrostatically by use of a power source arrangement 44, such as a dc power source, which provides a bias voltage across a portion of hinge 24 and SOI substrate 10. By controlling the bias voltage, it is possible to control the angle position of micro-mirror 34 from its in-plane position (0°) up to the 45° out-of-plane. Also, by fabricating power source 44 and high-quality and low-noise electronic circuitry 46 for driving the micro-mirror and laser, on remaining sections of silicon device layer 16, full integration of opto-electronic and micro-electro-mechanical devices is realized.

The resonant frequency of the micro-mirror depends on the stiffness of the hinge and the weight of the mirror. The resonant frequency of the mirror is therefore configurable and can be designed to be in the tens of kHz.

Figure 7:
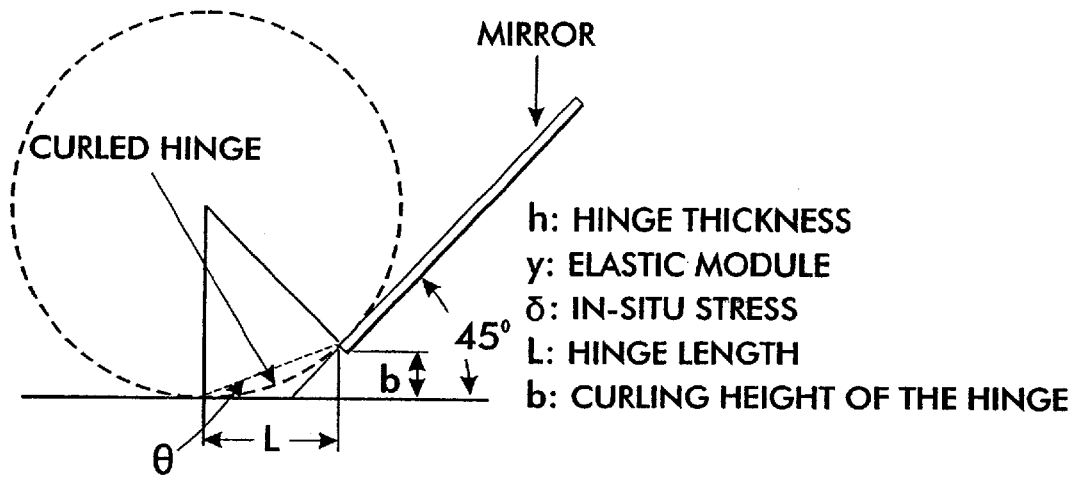
FIG. 7 depicts the angles and parameters to raise a micro-mirror to an angle of approximately 45°.

As shown in FIG. 7, in order to raise scanning micro-mirror 34 to an angle of 45° relative to the substrate surface, the angle between bimorph hinge 24 and SOI substrate 10 should be approximately 22.5°. The lift or curling height of the hinge (b), can be expressed as:

$$b \sim L^2 \Delta\sigma / 2hY',$$

where L is hinge length, $\Delta\sigma$ is the stress difference of the bimorph material, h is the hinge layer thickness, and Y' is the average elastic modulus of the bimorph material.

When L is chosen to be 200 $\mu$m long, the resulting lift height is 82 $\mu$m. If the bimorph layer thickness is 1 $\mu$m, then the stress difference in the bimorph material should be 2.4 GPa, to curl the layer at 22.5°. This stress difference can be realized by use of sputtered Mo—Cr.

As shown by the above equation, increasing the length of the bimorph layer reduces the stress difference required to curl the bending part at 22.5°. However, the height of the micro-mirror increases relative to the substrate surface, which makes it more difficult to align the center of the micro-mirror to the laser beam horizontally due to the limitations of the laser chip thickness. In one embodiment, for example, the thickness of the laser assembly or die is about 120 $\mu$m. Assuming that a solder bump height is about 40 $\mu$m, the active region of the laser is then 160 $\mu$m above the substrate surface.

Figure 8:
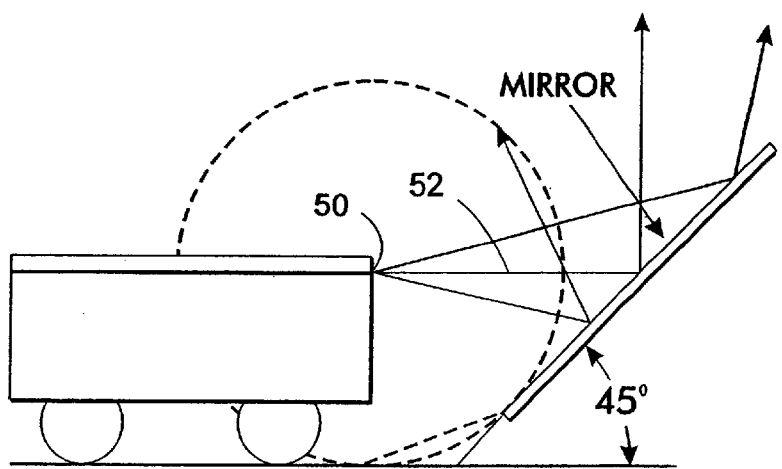
FIG. 8 depicts the relationship between the mirror dimensions and the distance of the laser from the mirror.

As shown in FIG. 8, the edge-emitting laser end facet 50 is aligned to the starting line 52 of the curled hinge 24. Assuming that the divergence angles of the laser are 35° vertically at full width half maximum (FWHM) and 8% horizontally at FWHM, the minimum error dimension of the hinge should be 200 $\mu$m long and 150 $\mu$m wide in order to fully contain the laser beam.

As previously noted, a mirror scan can be realized electrostatically by a voltage biased across the bimorph material and the SOI substrate 10. For application as an agile raster optical scanning (ROS) system, the required scan angle is on the order of a few degrees. Therefore the present system is useful to this concept. It is noted that the pre-scan angle of the mirror can be adjusted by the d.c. bias voltage.

As also previously mentioned, the micro-mirror can be fabricated in the device layer of the silicon-on-insulator substrate so that the mirror is made out of single crystal silicon, which permits fabrication of high-quality, optically flat and polished surfaces.

The mirror is released in a first embodiment by etching away the buried oxide layer ($SiO_2$) 14 located underneath the first device layer portion and part of the hinge. However, in a second embodiment, the mirror may be released by etching away the silicon substrate 12 and the buried oxide layer 14 by opening a window from the back of substrate 12. The second mirror release embodiment acts to reduce the release time necessary for allowing movement of the mirror.

Figure 9:
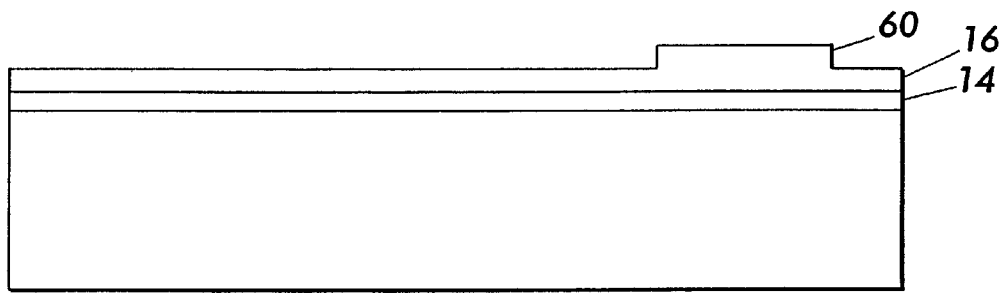
FIG. 9 depicts a SOI wafer used in a second embodiment of the present invention.

A second embodiment of the present invention may be achieved using an SOI wafer such as described in connection with FIG. 1. In a first step as shown in FIG. 9, patterning and etching processing forms a mirror 60 from device layer 16. Next, with attention to FIG. 10, etch processing has been used to configure a ribbon hinge structure 62. Processing of ribbon hinge structure 22 defines a first device layer portion 64, which carries mirror 60, and a second device layer portion 66. Both portions are integrated to the ribbon hinge 62. The thinning of ribbon 62 is sufficient to maintain mechanical stability while providing a flexible mechanism for movement of micro-mirror 60.

Thus, ribbon hinge 62 is formed from the device layer 16 which has been thinned down to allow increased mechanical flexibility. This design produces a high-quality mechanical structure having sufficient strength for its intended purpose. In this embodiment, the ribbon hinge or structure 64 may be approximately 500 nm thick, approximately 50 $\mu$m wide and approximately 140 $\mu$m in length.

More particularly, ribbon hinge 62 may be formed using a two-mask process. The area to be thinned is first lithographically exposed and surrounding areas protected, before a time wet etch reduces the thickness of the exposed silicon area to approximately 500 nm or other appropriate depth. Then a subsequent lithographic step is used to pattern the hinge. Therefore the main difference between the ribbon hinge and first and second device layer portions 64,66 is the geometry of the patterning, and the physical thickness of the areas.

Figure 10:
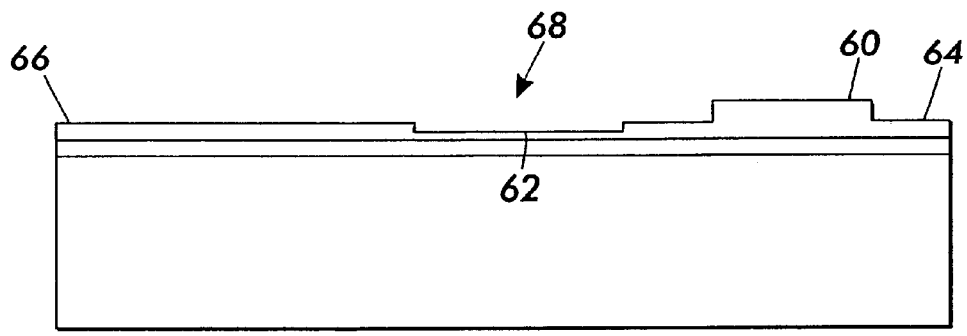
FIG. 10 depicts the etching of a ribbon hinge configuration to be used as the hinge element in the present invention between a first portion and a second portion on the device layer.

As can be seen in FIG. 10, ribbon hinge 62 is fully integrated to the first and second device layer portions 64,66. This difference in device layer thickness defines a trench area 68 used advantageously to introduce stress tension allowing for movement of mirror 60 once it is released from buried oxide layer 14.

Figure 11:
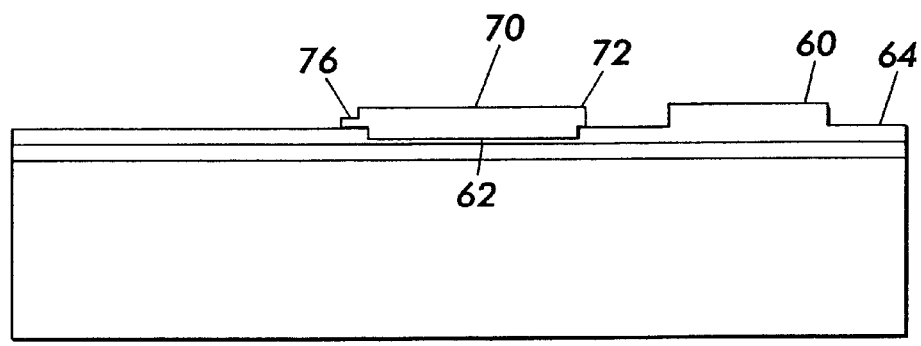
FIG. 11 illustrates the depositing of bi-morph material on the ribbon hinge of FIG. 10.

FIG. 11 illustrates this concept more clearly by depicting bimorph material 70 having been deposited within trench area 68. The bimorph material 70 is deposited directly on top of ribbon hinge 62. As in the previous embodiment, the bimorph material can be either a single metal layer such as sputtered Mo—Cr having compressive and tensile stress gradients or multiple layers composed of compressively stressed poly-Si on the bottom and tensile strained metal on the top. After depositing the bimorph material 70, an etching process such as a wet-etch solution or other known procedure is used to remove the buried oxide layer 14 from beneath mirror 60, and partially under ribbon hinge 62. In an alternative embodiment, the mirror and portion of the ribbon hinge may be released by etching away the silicon substrate layer 12 and the buried oxide layer 14 underneath the first device layer 64 and portion of ribbon hinge 62 by opening a window 76 from the back of substrate 12.

Figure 12:
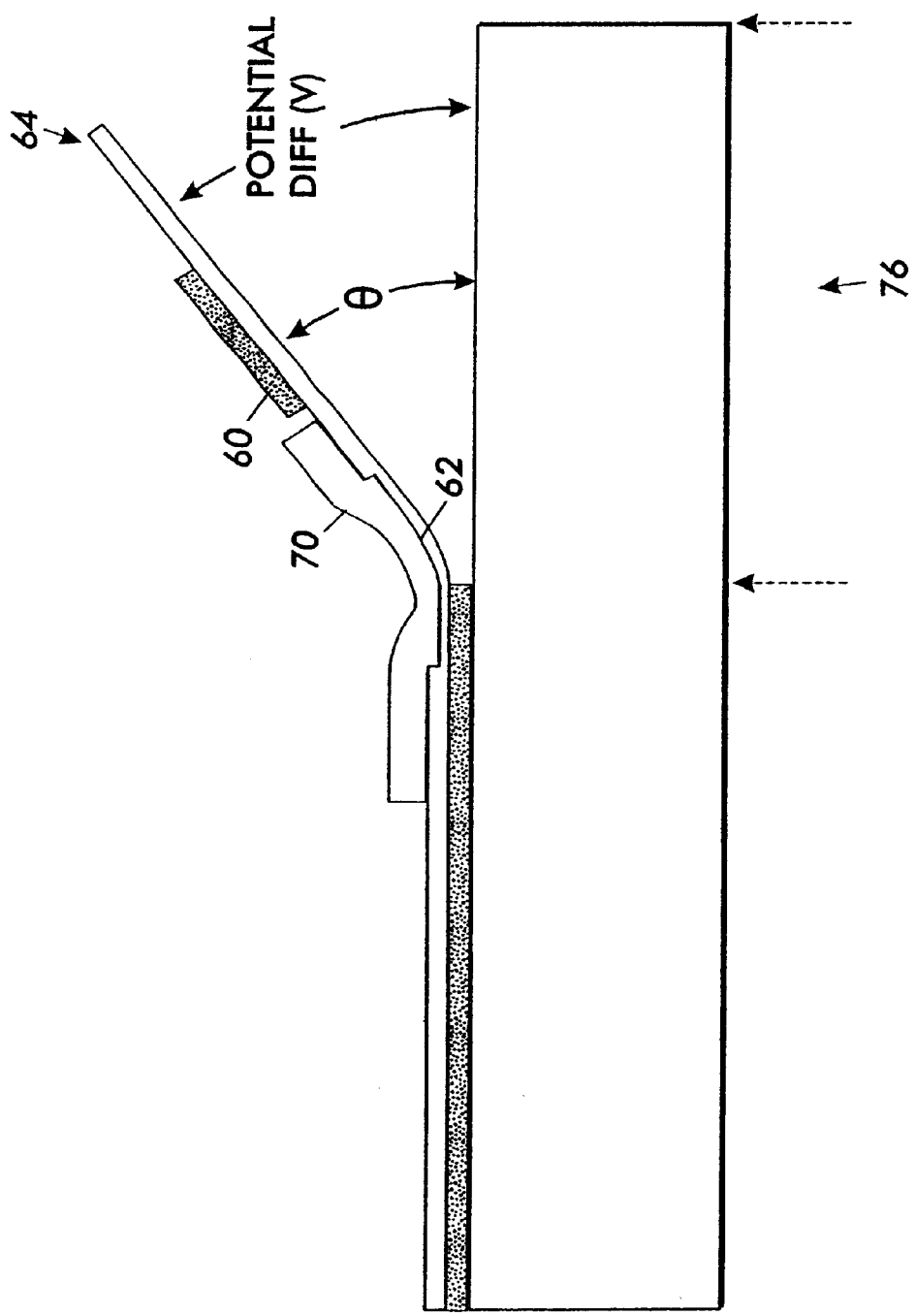
FIG. 12 depicts the attachment of a micro-mirror and edge laser on the device layer portions.
Figure 13:
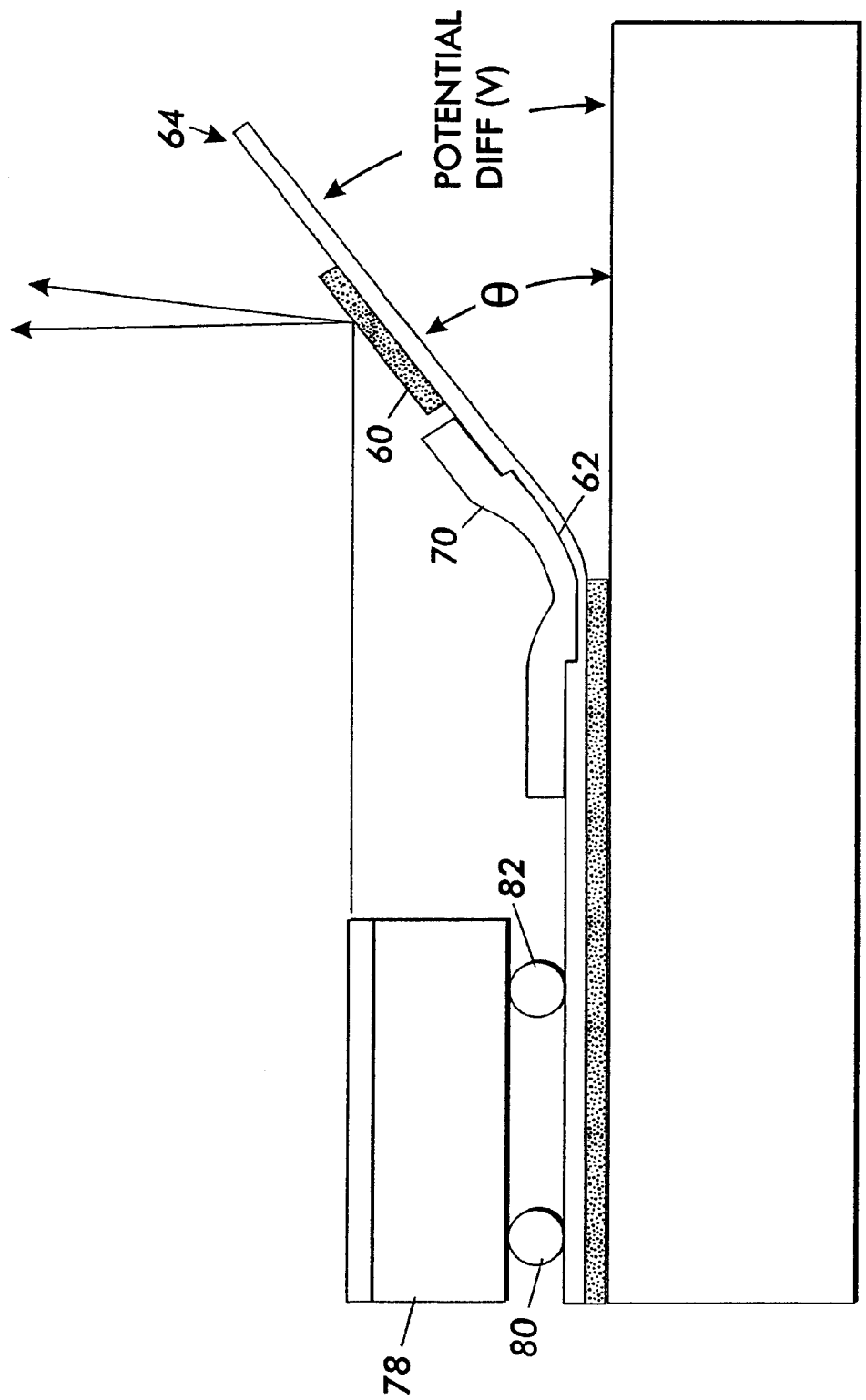
FIG. 13 shows an integrated MOEMS laser scanner according to a second embodiment.

Once released, as shown in FIG. 12, the mirror rises to a height determined in accordance with parameters discussed in connection with the first embodiment. After the mirror is released, and as shown in FIG. 13, a laser chip or assembly 78 is integrated onto the second device layer portion 66 by a flip-chip bonding technique through the use of solder balls 80 and 82, or by some other known attachment technique.

It is to be noted that the processes illustrated in the first embodiment and the second embodiment follow somewhat different steps. For example, in the first embodiment, the laser is attached prior to release of the mirror. This is intended to show that alternative configurations for construction of scanning devices disclosed herein are possible. It is therefore to be understood that the exact sequence of construction for both embodiments may be adjusted from what is shown in these embodiments, and these embodiments are set forth only as exemplary process techniques and not to limit the concepts of the invention to these techniques.

Figure 14:
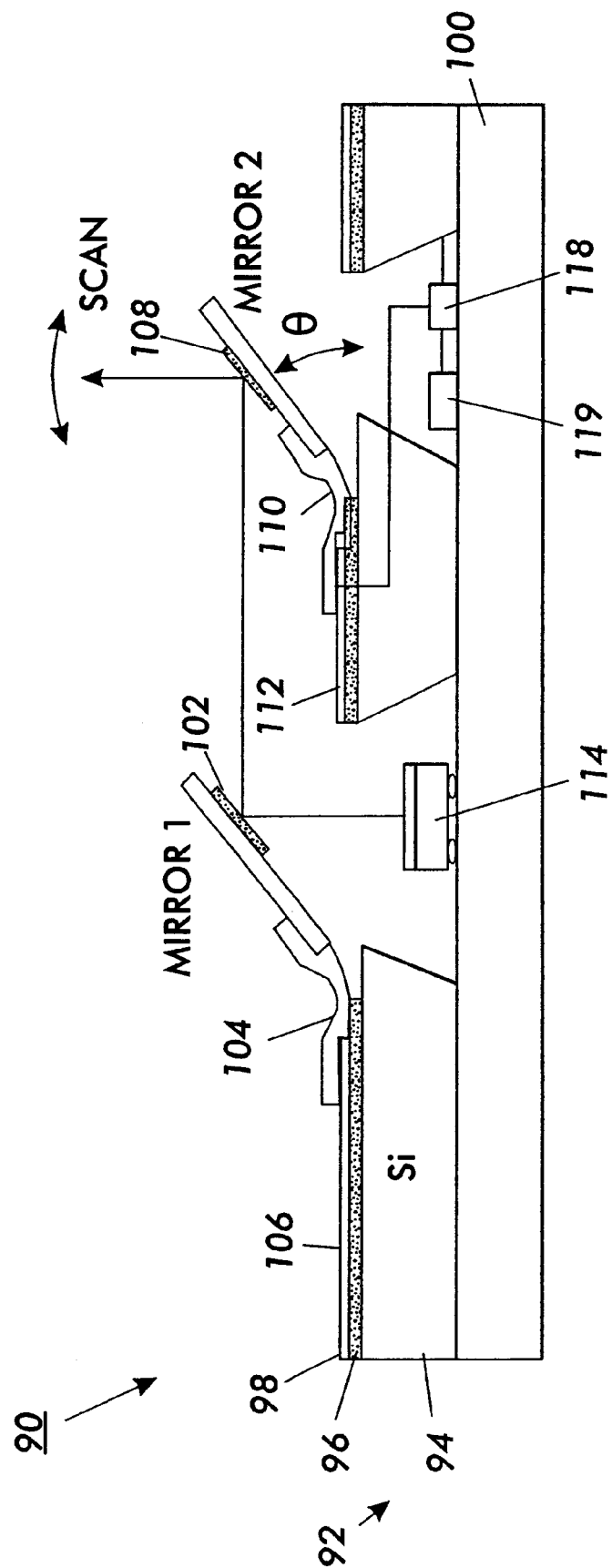
FIG. 14 depicts a first embodiment of a multi-mirror scanning system implementing concepts of the present invention.

Turning to FIG. 14, set forth is an alternative design for an integrated MOEMS laser scanner 90. The etching techniques and lithographic processes for constructing this device would be within the understanding of one in the art, and would employ similar known manufacturing techniques, such as shown in connection with the first two embodiments.

The present embodiment also uses a silicon-on-insulator (SOI) wafer substrate 92 having a silicon substrate layer 94, a buried oxide layer 96 and a device layer 98. In addition, a carrying substrate 100 is used, and which also may be of silicon, metal or other appropriate material. Carrying substrate 100 can be bonded to the SOI substrate 92 by anodic bonding or metallurgic bonding techniques. In an alternative embodiment to FIG. 14, instead of using additional substrate 100, silicon substrate 12 may be etched partially through, as opposed to the full etch as in FIG. 14. In this embodiment the carrying substrate 100 would not be required.

In the architecture shown in FIG. 14, a first mirror 102 is attached to a hinge 104 which in turn is partially anchored to a device layer portion 106. Buried oxide layer 94 and silicon substrate 92 have been removed such that mirror 102, which faces in a downward position, angles away from its initial in-plane position by a predetermined angle. A second mirror 108 is also connected via a hinge 110 to a device layer portion 112. Second mirror 108 is designed to face upward upon its release from the buried oxide layer 96. The angle of the mirrors is determined by parameters such as the degree of stresses in a bimorph material either incorporated into the spring 110 or deposited thereon such as in the previous embodiments. Hinges 104, 110 may be designed as described in the previous embodiments.

A vertical cavity surface-emitting layer (VCSEL) 114 is bonded to carrying substrate 100 by use of flip-chip bonding or other connection techniques. In operation, laser beam 116 emitted from VCSEL 114 impinges upon mirror 102 which directs the laser beam to mirror 108. Mirror 102 may be a fixed passive mirror wherein once in a set position it is maintained in that position and mirror 108 may have the capability of being scanned. This capability is achieved by voltage source 118 which generates a bias voltage across the hinge 110 and substrate 90. By application of varying voltages (for example, by a controller 119), movement of hinge 110 is controllable within the range from an in-plane position to a maximum out-plane position determined by the stresses of the bimorph material.

It is also possible to provide a biasing voltage to mirror 102 to allow scanning or movement of this mirror. An advantage of using a VCSEL is its low beam divergence and circular beam profile.

Figure 15:
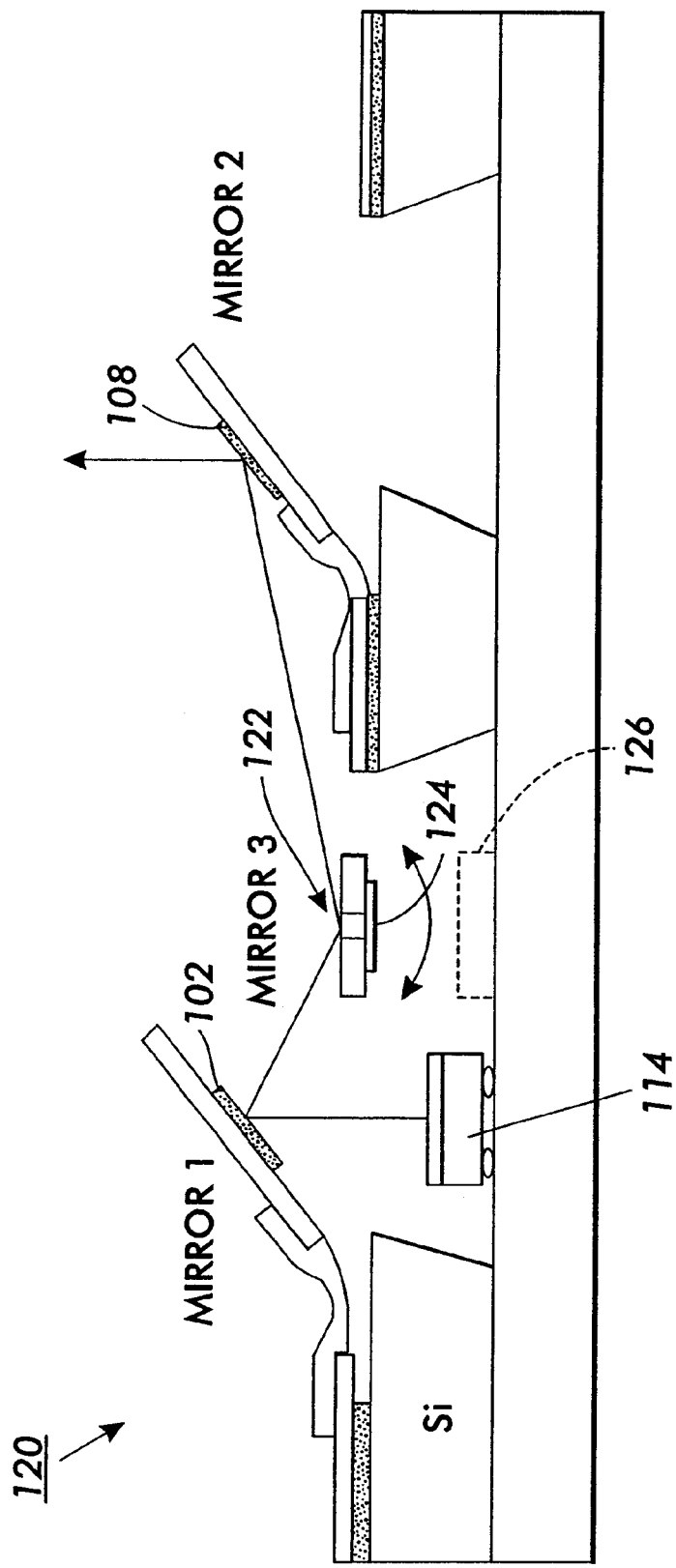
FIG. 15 sets forth a second embodiment of a multi-mirror scanning configuration using the concepts of the present invention.

Turning to FIG. 15, illustrated is an alternative laser scanner 120 design in which in addition to lift-up mirrors 102 and 108 of FIG. 14 also provided is an in-plane torsion hinge mirror 122, used for beam scanning. The torsion hinge mirror 122 is driven magnetically by a current coil 124 on the mirror 122 generating a magnetic field which interacts with an external magnetic field (not shown). The metal or current coil 122 is deposited on the surface of the torsion hinge mirror 122 to generate an on-board magnetic field which interacts with the external magnetic field (with the field direction parallel to the mirror). In an alternative embodiment, the torsion hinge mirror is activated electrostatically with double electrode plates 126 located underneath the mirror deposited on the laser carrying substrate 100. The electrode plates 126 are deposited by electroplating to make the plate thickness up to hundreds of micrometers so that a smaller gap between the mirror and the electrodes are realized.

It is noted that each of the embodiments are capable of having electronics integrated thereon such as disclosed in connection with FIGS. 5, 6 and 14.

While the present invention is described with respect to preferred embodiments, it would apparent to one skilled in the art to practice the present invention in other configurations and designs. Such alternate embodiments would not cause departure from the spirit and scope of the present invention.

Having thus described the preferred embodiments, what is claimed is:

1. A micro-optical-electrical-mechanical laser scanner comprising:

a silicon-on-insulator substrate having a silicon substrate layer, a buried oxide layer, and a single crystal silicon device layer;

a first device layer portion of the single crystal silicon device layer;

a micro-mirror fabricated on the first device layer portion;

a second device layer portion of the single crystal silicon device layer;

a laser positioned on at least a portion of the silicon-on-insulator substrate to selectively emit laser light at the micro-mirror;

a hinge connecting the first device layer portion and the second device layer portion of the single crystal silicon device layer; and a bimorph material layer deposited over at least a portion of the hinge, the bi-morph material layer having a built-in stress wherein the micro-mirror and at least a portion of the hinge are released from the buried oxide layer and the bimorph material causes the hinge to move the released micro-mirror out of a horizontal position.

2. The invention according to claim 1 wherein the micro-mirror is moved out of the horizontal position to an angle wherein the micro-mirror either directly or indirectly reflects a laser beam emitted from the laser.

3. The invention according to claim 1 wherein the hinge is a ribbon hinge.

4. The invention according to claim 1 further including a power source generating a potential difference between the hinge and the silicon-on-insulator substrate, wherein the power source controls movement of the micro-mirror.

5. The invention according to claim 4 wherein the movement of the micro-mirror results in a scan of the laser beam.

6. The invention according to claim 4 wherein the mirror has a resonant frequency determined by a stiffness of the hinge and a weight of the mirror.

7. The invention according to claim 6 wherein the resonant frequency is configurable up to the tens of kHz.

8. The invention according to claim 1 wherein the micro-optical-electrical-mechanical laser scanner is at least one of a micro-optical-electrical-mechanical barcode scanner, a micro-optical-electrical-mechanical retina scanner, a micro-optical-electrical-mechanical xerographic scanner, and a micro-optical-electrical-mechanical laser printer scanner.

9. The invention according to claim 1 wherein the laser is integrated onto the substrate by micropositioning.

10. The invention according to claim 1 wherein an angle of the mirror once released is approximately 45 degrees relative to the silicon-on-insulator substrate surface and an angle between the hinge and the silicon-on-insulator substrate surface is approximately 22.5 degrees.

11. The invention according to claim 1 wherein a lift height of the hinge is expressed as:

$$b \sim L2\Delta\sigma/2hY'$$

where L is the length of the hinge, $\Delta\sigma$ is the stress difference of the bimorph material, h is the hinge layer thickness, and Y' is the average elastic modulas of the bimorph material.

12. The invention according to claim 1 wherein electronic circuitry for driving the micro-mirror and laser is fabricated in the device layer of the silicon-on-insulator substrate.

13. The invention according to claim 1 wherein the micro-mirror fabricated on the first device layer includes the micro-mirror being formed lithographically.

14. The invention according to claim 1 wherein the micro-mirror fabricated on the first device layer is a polished upper surface of the first device layer portion.

15. The invention according to claim 1 further including:

a second micro-mirror fabricated on a portion of the single crystal silicon device layer;

a second hinge connecting the second micro-mirror to the silicon-on-insulator substrate;

a second bimorph material layer deposited over at least a portion of the second hinge, the second bimorph material layer having a built-in stress wherein the second bimorph material layer causes the second hinge to move the second micro-mirror out of a horizontal position; and a carrier substrate bonded to a bottom surface of the silicon substrate layer of the silicon-on-insulator substrate.

16. The invention according to claim 15 wherein the micro-mirror, which is a first micro-mirror, and the second micro-mirror are positioned in relationship to each other such that the reflected laser beam from the first micro-mirror is reflected off the second micro-mirror at an angle perpendicular to the surface of the device layer.

17. The invention according to claim 15 further including a third micro-mirror positioned between the micro-mirror, which is a first micro-mirror, and the second micro-mirror, the first micro-mirror angled to reflect the laser beam to the third micro-mirror, and the third micro-mirror positioned in relationship to the second micro-mirror to reflect the laser beam off of the second micro-mirror at an angle perpendicular to the device layer.

18. The invention according to claim 17 wherein at least one of the first, second, and third micro-mirrors are driven by at least one of electrostatic and magnetic action.

19. The invention according to claim 17 wherein the third micro-mirror is an in-plane torsion hinge mirror.

20. The invention according to claim 1 wherein the laser is configured at a position to permit a laser beam exiting the laser to selectively be reflected off of the micro-mirror.

21. The invention according to claim 20 wherein a lift height of the hinge is expressed as:

$$b \sim L2\Delta\sigma/2hY'$$

where L is the length of the hinge, $\Delta\sigma$ is the stress difference of the bimorph material, h is the hinge layer thickness, and Y' is the average elastic modulas of the bimorph material.

* * * * *